UNITED STATES PATENT OFFICE.

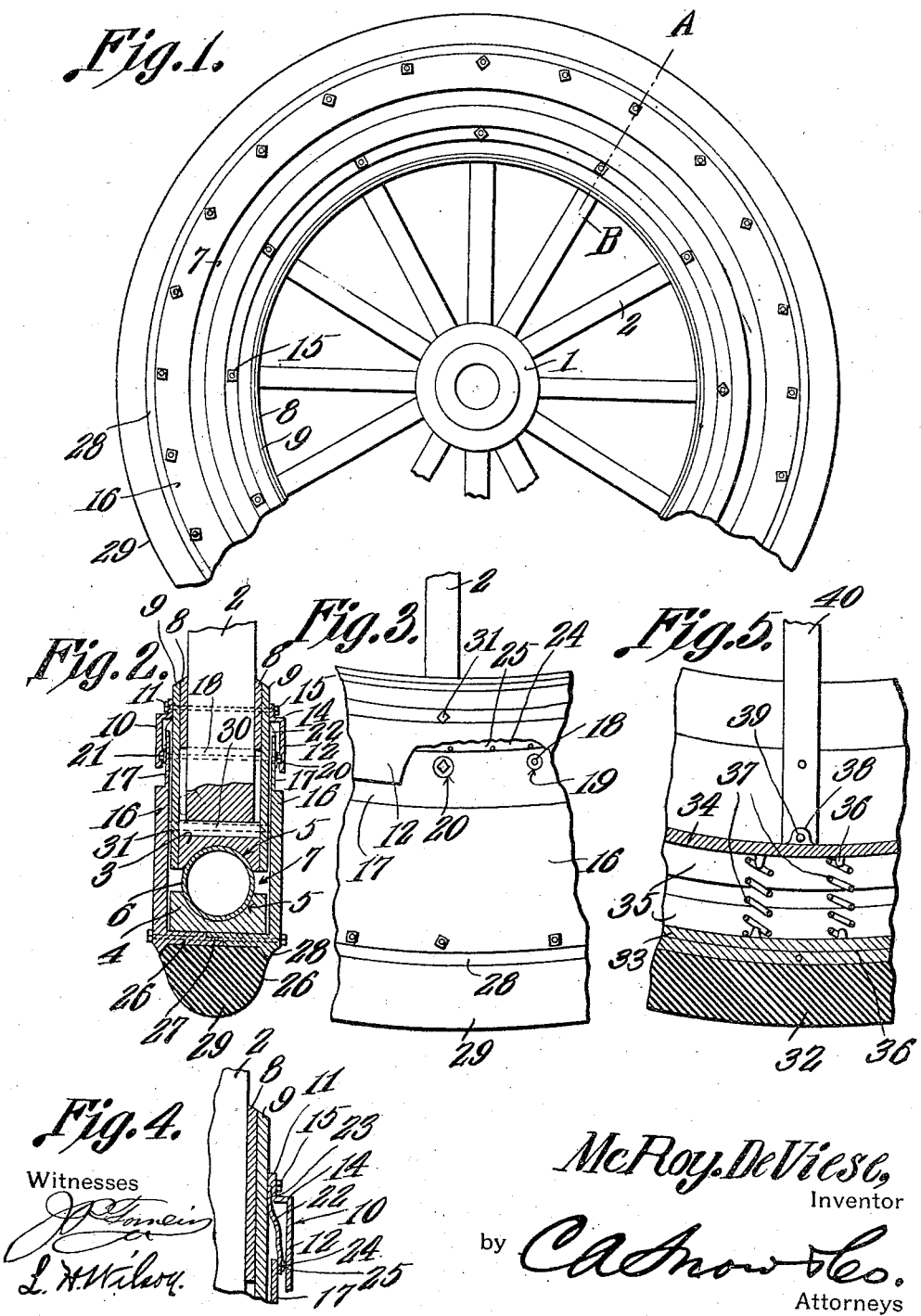

McROY DE VIESE, OF FRESNO, CALIFORNIA.

PUNCTURE-PROOF TIRE.

1,028,334.

Specification of Letters Patent.

Patented June 4, 1912.

Application filed October 7, 1911. Serial No. 653,392.

*To all whom it may concern:*

Be it known that I, McRoy De Viese, a citizen of the United States, residing at Fresno in the county of Fresno and State of California, have invented a new and useful Puncture-Proof Tire, of which the following is a specification.

It is the object of the present invention to provide a means whereby the resilient element of a spring wheel may be housed within the rim structure, against accidental injury.

A further object of the invention is to provide a novel series of members adapted to inclose the resilient element of a wheel structure; and to provide novel means for assembling these members with the spokes of the wheel.

In the accompanying drawings,—Figure 1 is a fragmental side elevation; Fig. 2 is a section upon the line A—B of Fig. 1; Fig. 3 is an enlarged detail from Fig. 1, parts being broken away; Fig. 4 is a sectional detail enlarged from Fig. 2; and Fig. 5 is a sectional side elevation, showing a modified form of the invention.

In the accompanying drawings, the hub is denoted by the numeral 1, and the spokes by the numeral 2.

The invention includes a primary rim 3, and a secondary rim 4, inclosing the primary rim 3 circumferentially, the rims 3 and 4 having in their adjacent faces, recesses 5. In the recesses 5, an inflatable pneumatic tube 6 is adapted to fit, the rims 3 and 4 being spaced apart, as denoted by the numeral 7.

Located upon both sides of the spokes 2, are the spoke flanges 8, and upon the outside of the spoke flanges 8 are side plates 9, the plates 9 being extended in flush relation with respect to the periphery of the primary rim 3. To the side plates 9 are applied guards, denoted generally by the numeral 10. These guards 10 comprise, each, parallel, spaced flanges 11 and 12, connected by a rectangularly disposed portion 14. The flanges 11 are applied to the side plates 9, and through the flanges 11, through the side plates 9, through the spoke flanges 8, and through the spokes 2 are extended securing elements, preferably taking the form of bolts 15.

The invention further includes a pair of cover plates 16, lying upon the outside of the side plates 9. The cover plates 16 at their inner edges, are thinned, as shown at 17, to fit between the flanges 12 of the guards 10 and the side plates 9, so that the outer faces of the cover plates 16 will be flush with the outer faces of the flanges 12 of the guards 10. Through the thinned portions 17 of the cover plates 16, through the side plates 9, through the spoke flanges 8, and through the spokes 2 are extended securing elements, preferably taking the form of bolts 18. In the thinned portions 17 of the cover plates 16 there are openings 19, of considerably greater diameter than the diameter of the bolts 18, the construction being such that the cover plates 16 may have movement upon the bolts 18, to permit a compression of the tube 6. The openings 19 are covered by washers 20, carried by the bolts 18; and the ends of the bolts 18 are received in recesses 21 formed in the inner faces of the flanges 12 of the guards 10.

The invention further includes a pair of flexible members 22, the inner edges of which are received in recesses 23 fashioned in the inner faces of the flanges 11 of the guards 10, the flanges 11 serving to bind the inner edges of the flexible strips 22 against the side plates 9, as clearly shown in Fig. 4. The outer edges of the flexible members 22 overlap the portions 17 of the cover plates 16, and upon the flexible members 22, adjacent their outer edges, reinforcing strips 24 are placed, securing elements 25 being passed through the reinforcing strips 24, and through the flexible members 22, into engagement with the thinned portions 17 of the cover plates 16. The outer edges of the cover plates 16 are equipped with tread flanges 26, extended toward the median plane of the wheel, the traced flanges 26 being overlapped upon each other and scarfed together, as shown at 27. Adjacent the side edges of the wheel, the tread flanges 26 are equipped with outstanding ribs 28, between which is disposed the tire 29, which may be of any desired construction. The primary rim 3 is formed with inwardly projecting ribs 30, adapted to fit in recesses in the ends of the spokes 2, bolts 31 being passed through the ribs 30, and through the side plates 9, to afford an additional means for securing the side plates 9 to the spokes.

In that form of the invention which appears in Fig. 5, the tire is denoted by the numeral 32, the secondary rim by the numeral 33, and the primary rim by the numeral 34, the rims 33 and 34 being recessed, as at 35, in the manner hereinbefore described.

In that form of the invention which appears in Fig. 5, the pneumatic tube is dispensed with, its place being taken by radially disposed, helical compression springs 37, disposed upon each side of each of the spokes 40, there being inwardly projecting lugs 36 fashioned in the rims 33 and 34, which lugs 36 receive the ends of the springs 37. The primary rim 34 is provided with the outstanding rib 38, as before, and through this rib 38 passes a securing bolt 39, for the purpose hereinbefore set forth.

Owing to the fact that the pneumatic tube 6 is located between the rims 3 and 4, and is housed in laterally by the cover plates 16, it will be seen that a puncture of the member 6 will be a practical impossibility.

Owing to the fact that the securing bolts 18 pass loosely through the holes 19 in the cover plates 16, the cover plates will have limited movement, thereby providing for an expansion and compression of the pneumatic tube 6. The inner edges of the cover plates 16 are received within the guards 10, and thus moisture is prevented from gaining access to the interior of the structure. The device is further made dust proof and moisture proof, by reason of the presence of the flexible strips 22 which, extending entirely about the structure, circumferentially of the same, serve to prevent the entrance of dust and moisture between the cover plates 16 and the side plates 9. The guards 10 obviously serve to protect the flexible strips 22.

It will be understood that, when desired, the pneumatic tube 6, shown in Fig. 2, may be replaced by the springs 37, shown in Fig. 5.

Having thus described the invention, what is claimed is:—

1. In a device of the class described, a primary rim; side plates applied thereto; a secondary rim; resilient means located between the rims and spacing them apart; cover plates connected with the secondary rim and overlapping the side plates; guards secured to the outer faces of the side plates and having portions disposed substantially parallel to the side plates and spaced from the side plates, the cover plates extending beneath said portions of the guards; and flexible members secured along one edge to the side plates, the flexible members extending substantially parallel to the side plates and having their outer edges attached to the cover plates; said portions of the guards serving to house the flexible members completely.

2. In a device of the class described, a primary rim; a secondary rim; means disposed between the rims for normally maintaining the same spaced apart; side plates secured to the primary rim; cover plates located upon the outside of the side plates, the cover plates having angularly disposed tread flanges inclosing the secondary rim; guards secured to the side plates and overlapping the edges of the cover plates; flexible members bound between the guards and the side plates, the guards being recessed to receive the edges of the flexible members; the flexible members being overlapped upon the cover plates and secured thereto; and securing elements extended through the side plates, and loosely through the cover plates, the guards having recesses in which the ends of the securing elements are received.

3. In a device of the class described, side plates; a primary rim held between the side plates; a secondary rim inclosing the primary rim circumferentially; resilient means located between the rims, for maintaining the same normally spaced apart; cover plates located upon the outside of the side plates, the cover plates having angularly formed tread flanges, extended across the secondary rim; securing members extended through the side plates, and loosely engaged with the cover plates, to permit an expansion and compression of the resilient means; guards secured to the side plates, and having recesses adapted to receive the ends of the securing members; the flexible members being engaged between the guards and the side plates, the flexible members overlapping the cover plates; reinforcing strips disposed upon the flexible members; and securing elements uniting the reinforcing strips, the flexible members, and the cover plates.

In testimony that I claim the foregoing as my own, I have hereto affixed my signature in the presence of two witnesses.

McROY DE VIESE.

Witnesses:
P. E. HEISEL,
W. H. CODLE.

Copies of this patent may be obtained for five cents each, by addressing the "Commissioner of Patents, Washington, D. C."